United States Patent Office 3,195,931
Patented July 20, 1965

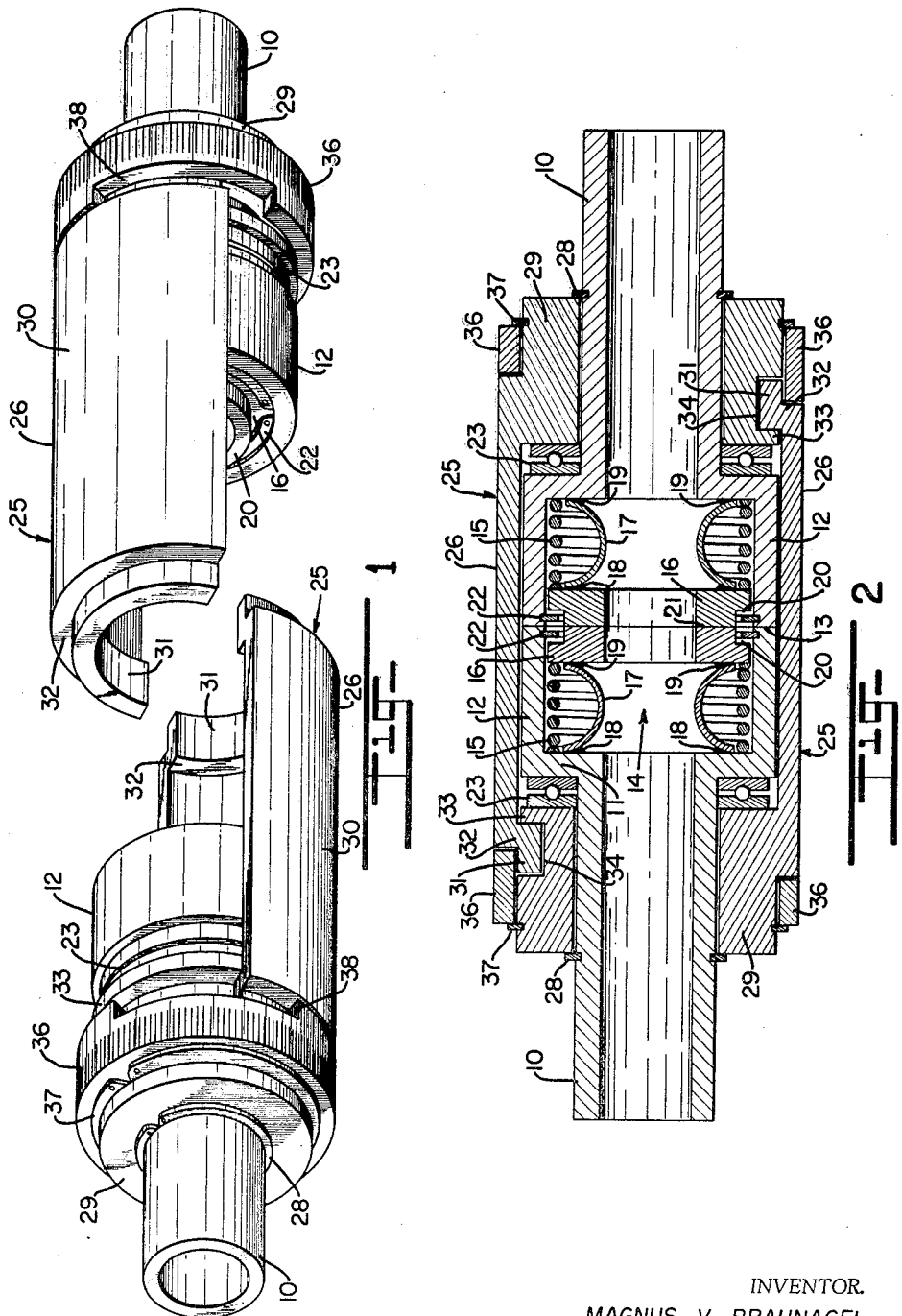

3,195,931
SYMMETRICAL HOSE COUPLING
Magnus V. Braunagel, Littleton, Colo., assignor, by mesne assignments, to Space Technology and Research Corporation, Denver, Colo., a corporation of Colorado
Filed Mar. 18, 1963, Ser. No. 269,231
4 Claims. (Cl. 285—70)

This invention relates to a conduit coupling and particularly a symmetrical, rotatable coupling for a hose, pipe or tube of the type used to conduct fluids.

Some prior art coupling devices are unsymmetrical in that one side of the coupling must be connected to the right and the other side to the left, or one side of the coupling must be connected to the upstream end and the other side to the downstream end, or one of the couplings is a female type and the other is a male type. The use of such coupling devices often leads to confusion, delay and frustration, especially when one finds that he has been trying to connect two identical, unmated couplings instead of two mates, but unlike couplings.

Among other disadvantages found in prior art conduit couplings are threaded joints, which require considerable twisting, often with the use of a wrench. Such couplings often come unscrewed by vibration. Other couplings employ resilient gaskets or sealing rings which deteriorate with age and service. They develop leaks with increasing internal fluid pressure and sometimes present undue fluid flow resistance and flow resistance by constriction. Still other couplings are unduly weak, or unduly heavy and bulky, and some employ spring-loaded snaps that are hazardous to the operators' hands.

Accordingly, it is an important object of this invention to provide a symmetrical conduit coupling wherein the two coupling members are identical in structure and function and are interchangeable.

Another object of this invention is to provide such a symmetrical coupling which is capable of being joined by snap action without the use of threads or wrenches and is vibration-proof.

A further object of this invention is to provide a strong, light-weight, safe, compact coupling which offers minimal flow restriction and a maximum of fluid sealing qualities under high fluid pressures, as well as a maximum service life.

A still further object of this invention is to provide a snap action coupling which can be joined and unjoined safely, rapidly, positively, and conveniently even under modest fluid pressure, without the use of special auxiliary tools or implements.

Additional objects will become apparent from the following description, which is given primarily for purposes of illustration, and not limitation.

Stated in general terms, the objects of this invention are attained by providing a conduit coupling which, in addition to the two aligned conduit sections to be coupled, includes a pair of coupling sections of larger dimensions attached to, or integral with, the conduit sections, and disposed in abutting relationship with each other to form a chamber which establishes communication between the two aligned conduit sections. A pair of apertured gaskets, of which each one of the pair is slidably and transversely disposed inside one of the two coupling sections, are urged into fluid-sealing engagement with each other by coiled springs nested inside the coupling sections. Each one of a pair of bellows sections is brazed to a conduit section and to one of the gaskets in a resilient fluid-tight relationship, and in a manner so that fluid pressure of fluid inside the conduit sections is translated into pressure applied axially to the gaskets to urge them into relatively tighter fluid-sealing engagement with each other. The bellows sections preferably have an axial, cross-sectional curvature or shape substantially approaching that of a catenary.

A pair of circular bearings, such as ball bearing assemblies, preferably are mounted around each of the conduit sections adjacent the coupling sections to reduce rotational friction so that the coupling conveniently can be used as a rotary joint. The resulting coupling assembly is housed in a coupling sleeve of generally cylindrical configuration. This coupling sleeve preferably is split longitudinally into two hemi-cylindrical sections, both of which are fitted snugly, and preferably symmetrically, around the resulting coupling assembly. A pair of locking rings preferably also are mounted rotatably around the hemi-cylindrical sleeve sections. Each one of the locking rings is adapted for rotation into a locking position to lock the two coupling assemblies and the coupling sleeve sections together into a strong, compact, light-weight, vibration-proof housed coupling. All of the paired parts which make up the conduit coupling of the invention preferably are made structurally identical and interchangeable. The parts also preferably are made of suitable metals.

A more detailed description of a specific embodiment of the invention is given below with reference to the appended drawings, wherein:

FIG. 1 is an isometric view showing two coupling assemblies oriented to be snapped together to form a joined coupling; and FIG. 2 is a longitudinal elevational view in section showing a joined coupling.

Each part of the symmetrical coupling appears therein in duplicate. The same reference numeral is used in the following description to indicate each part of the pair of parts described. Hose, pipe or tube sections 10 are provided, at the ends being coupled, with flaring flanges 11. Flanges 11 establish an integral connection between coupled sections 10 and larger diameter coupling sections 12. The ends of the coupling sections 12 abut each other at 13.

The abutting coupling sections 12, together with flanges 11, form a cylindrical chamber 14 which establishes communication between the tubular sections 10. In each of the two coupling sections 12 is nested a helical coil spring 15 fitted snugly inside the coupling section and between a flaring flange 11 and a sliding gasket 16. Each gasket 16 is resiliently connected to flange 11 of a coupling section 12 by a bellows section 17. The bellows sections 17 preferably have a longitudinal or axial cross-sectional shape or curvature substantially approaching that of a catenary curve, and each are brazed welded or soldered at their outer ends, as indicated at 18 and 19, to a flange 11 and a gasket 16, respectively, as shown.

The bellows sections 17 preferably are disposed radially inwardly of the coil springs 15, also as shown, so that the gaskets 16 can slide axially inside coupling sections 12. Each gasket 16 is provided with an annularly indented end portion 20, which is provided with a flat finished sealing surface 21, adapted for forming a fluid-tight pressure seal with the adjacent surface 21 of the adjacent gasket 16, while both gaskets 16 are urged into contact with each other under the compressive forces of coil springs 15.

The outer ends of each coupling section 12, adjacent mutual abutting zone 13, is provided with a snap ring 22 snapped into an annular groove cut into the inside of the coupling section. Each snap ring 22 projects into the annular indentation formed by the annular indented portion 20 of each gasket 16, and serves to retain the gasket 16 inside coupling section 12 by limiting its outward axial or longitudinal movement. An annular ball bearing assembly 23 is mounted snugly around the outside of each tubular section 10, and snugly against the outside wall of each flaring flange 11.

A generally cylindrical coupling sleeve 25, split longitudinally into two generally hemi-cylindrical sections 26, is fitted snugly around tubular sections 10, ball bearing assemblies 23 and coupling sections 12, to enclose the coupling sections and the ball bearing assemblies. Coupling sleeve 25 is retained longitudinally or axially in position around coupling sections 12 and ball bearing assemblies 23 by snap rings 28, snapped into annular grooves cut into the outside walls of tubular sections 10, and dimensioned to project snugly against the opposite ends of the coupling sleeve, as shown.

The sections 26 of the coupling sleeve 25 contain a cylindrical end portion 29, which fits snugly around the tubular section 10, and is integral with a hemi-cylindrical sleeve portion 30 (FIG. 1) of a sleeve section 26. The outer end of each sleeve portion 30 is provided with a short, reduced diameter section 31 integrally connected to the sleeve portion 30 by a reducing flange 32. The cylindrical end portions 29 are provided with bearing flanges 33 and annular grooves 34 outwardly of flanges 33. Rotatable locking rings 36 are inserted over end portions 29 and rotatably secured in place by snaprings 37 fitting into annular grooves in end portions 29.

As best shown in FIG. 1, the two coupling assemblies are brought together to form the joint between the tube sections 10 as follows. The two hemi-cylindrical sections 26 of coupling sleeve 25 are fitted together so that reduced diameter sections 31 of sleeve portions 30 fit into corresponding grooves 34, as best shown in FIG. 2. Flat finished sealing surfaces 21 of gaskets 16 are brought into sealing engagement. Pressure is manually applied to the sealing surfaces 21, through tube sections 10 to compress coil springs 15 and bellows sections 17. While tube sections 10 are pressed toward each other in this condition, locking rings 36 are urged into position over the end portions 29 of coupling sleeve sections 26 and reduced diameter sections 31.

Locking rings 36 are provided with semi-circumferential notches 38 for ease of fitting reduced diameter sections 31 into grooves 34. After the joint is made between the two coupling members, locking rings 36 are turned about a half turn to lock the two coupling members together. In the assembled coupling, sealing surfaces 21 are pressed together in sealing engagement by the pressure exerted upon gaskets 16 by coil springs 15, and by bellows sections 17. When fluid under pressure is transmitted through tube sections 10, fluid pressure is exerted upon bellows sections 17, and additional pressure is applied to sealing surfaces 21 through gaskets 16. Thus the sealing pressure is increased upon sealing surfaces 21 with increased internal fluid pressure.

It will be seen, from the above description, that the two coupling assemblies are symmetrical and identical, that the two coupling halves are joined by snap action, that the resulting coupling is vibration-proof, that the coupling has no threaded parts and that no plastic or rubber components are used. A strong, compact, light-weight, secure coupling offering a minimum flow restriction through minimum fluid flow resistance, is produced. Both coupling halves can be rotated relatively toward each other so that the coupling can, in effect, be used as a rotary joint as well as for fuel hose couplings, fire hose couplings, air or other gas hose couplings, and conduit couplings in general.

The coupling can be disassembled by turning locking rings 36 so that semi circumferential notches 38 are in register with hemi-cylindrical sections 26 of coupling sleeve 25, and snapping the two coupling assemblies apart, as shown in FIG. 1. The coupling can be made up again as described above by snapping the two coupling assemblies together and rotating locking rings 36 about a half-turn.

Obviously, many modifications and variations of the symmetrical conduit coupling of the present invention are possible in the light of the teachings given hereinabove. It is, therefore, to be understood that, within the scope of the appended claims, the invention can be practiced otherwise than as specifically described and illustrated.

What is claimed is:

1. A conduit coupling comprising two conduit sections aligned for coupling, a pair of coupling sections of larger dimensions than the conduit sections of which each one is attached to one of said conduit sections and disposed in abutting relationship with each other for forming a chamber establishing communication between the two aligned conduit sections, a pair of apertured gaskets of which each one is slidably disposed transversely adjacent the abutting zone inside one of the two coupling sections, a pair of coiled springs of which each one is nested inside one of the coupling sections for urging the gaskets into fluid-sealing engagement with each other, a pair of curved bellows sections of which each one is brazed respectively to a coupling section and a gasket in resilient fluid-tight relationship with its convex surface facing internally of the coupling section, said bellows sections being enclosed one each within a respective coiled spring and adapted to translate fluid pressure inside the conduit sections acting radially outward against its convex surface into axial pressure for urging the gaskets into relatively tighter fluid-sealing engagement with each other, and coupling sleeve means for housing the resulting coupling assembly.

2. A symmetrical conduit coupling comprising two conduit sections aligned for coupling, a pair of coupling sections of larger dimensions than the conduit sections of which each one is attached to one of said conduit sections and disposed in abutting relationship with each other for forming a chamber establishing communication between the two aligned conduit sections, a pair of apertured gaskets of which each one is slidably disposed transversely adjacent the abutting zone inside one of the two coupling sections, a pair of coiled springs of which each one is nested inside one of the coupling sections for urging the gaskets into fluid-sealing engagement with each other, a pair of bellows sections of which each one is enclosed in a coil spring and brazed respectively to a conduit section and a gasket in resilient fluid-tight relationship, said bellows sections each having an axial cross-sectional curvature substantially approaching that of a catenary and arranged with its convex surface facing internally of the coupling section and being adapted to translate fluid pressure inside the conduit sections acting radially outward against its convex surface into axial pressure for urging the gaskets into relatively tighter fluid-sealing engagement with each other, coupling sleeve means consisting of a pair of longitudinally split hemi-cylindrical sections each one of which is fitted snugly around the conduit sections and the coupling sections in symmetry for enclosing the resulting coupling assembly, and a pair of locking rings each one of which is rotatably mounted on one of the hemi-cylindrical sleeve sections and adapted for rotation into a locking position to lock the two coupling assemblies and the coupling sleeve means together.

3. A symmetrical hose coupling comprising two tubular hose-connection sections aligned for coupling, a pair of tubular coupling sections of larger diameter than the hose-connection sections of which each one is integrally connected to one of said hose-connection sections and disposed in abutting relationship with each other for forming a chamber establishing communication between the two aligned hose-connection sections, a pair of apertured gaskets of which each one is slidably disposed transversely adjacent the abutting zone inside one of the two coupling sections, a pair of coiled springs of which each one is nested inside one of the coupling sections for urging the gaskets into fluid sealing engagement with each other, a pair of bellows sections of which each one is enclosed in a coil spring and brazed respectively to a hose-connection section and a gasket in resilient fluid-tight relationship, said bellows sections each having an axial cross-sectional curvature substantially approaching that of a catenary and arranged with its convex surface facing internally of the coupling section and being adapted to translate fluid pressure inside the conduit sections acting radially outward against its convex surface into axial pressure for urging the gaskets into relatively tighter fluid-sealing engagement with each other, a pair of circular bearing means each one of which is disposed around one of the hose-connection sections adjacent one of the coupling sections for reducing rotational friction, coupling sleeve means consisting of a pair of longitudinally split hemi-cylindrical sections both of which are fitted snugly around the conduit sections and the coupling sections in symmetry for enclosing the resulting coupling assembly, and a pair of locking rings each one of which is rotatably mounted on one of the hemicylindrical sleeve sections and adapted for rotation into a locking position to lock the two coupling assemblies and the coupling sleeve means together.

4. A symmetrical hose coupling according to claim 3, wherein each of the paired parts thereof are structurally identical and interchangeable.

References Cited by the Examiner

UNITED STATES PATENTS

| | | | |
|---|---|---|---|
| 536,774 | 4/95 | Bailey | 285—70 |
| 2,038,855 | 4/36 | Rosenblad | 285—229 |
| 2,193,199 | 3/40 | McKee | 285—70 |
| 2,305,809 | 12/42 | Maisch | 285—100 |
| 2,407,745 | 9/46 | Jacobson | 285—299 |
| 2,816,779 | 12/57 | Jensen | 285—99 |
| 2,819,914 | 1/58 | Eitner | 285—70 |

CARL W. TOMLIN, *Primary Examiner.*

THOMAS J. CALLAGHAN, *Examiner.*